United States Patent [19]

Donley

[11] 4,147,556

[45] Apr. 3, 1979

[54] NONFLAMMABLE BETA DIKETONATE COMPOSITION

[75] Inventor: Harold E. Donley, Oakmont, Pa.

[73] Assignee: PPG Industries, Inc., Pittsburgh, Pa.

[21] Appl. No.: 764,249

[22] Filed: Jan. 31, 1977

Related U.S. Application Data

[63] Continuation of Ser. No. 217,222, Jan. 12, 1972, abandoned, which is a continuation-in-part of Ser. No. 16,670, Mar. 5, 1970, Pat. No. 3,660,061, which is a continuation-in-part of Ser. No. 684,131, Nov. 20, 1967, abandoned.

[51] Int. Cl.$^2$ .................................................. C09K 3/00
[52] U.S. Cl. ........................... 106/287.18; 106/287.19; 106/287.28; 260/429 J; 260/429.5
[58] Field of Search ........................... 106/287 R, 287; 260/429 J

[56] References Cited

U.S. PATENT DOCUMENTS

| | | | |
|---|---|---|---|
| 3,645,778 | 2/1972 | Nesteruk | 427/33 |
| 3,660,061 | 5/1972 | Donley et al. | 65/32 |

FOREIGN PATENT DOCUMENTS

890082  2/1962  United Kingdom ................. 260/429 J

*Primary Examiner*—Theodore Morris
*Attorney, Agent, or Firm*—Donna L. Seidel; E. Kears Pollock

[57] ABSTRACT

A composition suitable for producing a metal oxide coating on the surface of a heated refractory substrate is disclosed. The composition comprises a metal beta diketonate dissolved in a nonflammable, high-boiling, halocarbon-containing solvent mixture. The solvent mixture has surprisingly high solubility for transition metal beta diketonates. Because of the nonflammability and high-boiling characteristics of the solvent mixture, the composition is particularly useful for coating freshly formed float glass.

15 Claims, No Drawings

NONFLAMMABLE BETA DIKETONATE COMPOSITION

CROSS REFERENCE TO RELATED APPLICATIONS

This application is a continuation of my copending application Ser. No. 217,222, filed Jan. 12, 1972, now abandoned, which is a continuation-in-part of application Ser. No. 16,670, filed Mar. 5, 1970, now U.S. Pat. No. 3,660,061, which is a continuation-in-part of application Ser. No. 684,131, filed Nov. 20, 1967, now abandoned.

BACKGROUND OF THE INVENTION

1. Field of the Invention

This invention relates to a composition suitable for the forming of metal oxide coatings on refractory substrates. More particularly, this invention relates to a nonflammable, high-boiling composition which is suitable for producing a colored, substantially transparent metal oxide coating on a freshly formed float glass.

2. Description of the Prior Art

Transition metal oxide coatings on refractory substrates such as glass are well known in the art. The coatings are colored and are useful as solar radiation filters in architectural glass applications. The metal oxide coatings can be formed by applying in an oxidizing atmosphere a solution of an organo-metallic compound dissolved in an organic vehicle to a refractory substrate which has been preheated to a temperature of about 900°–1200° F. On contacting the heated substrate, the solution is believed to pyrolyze, and a metal oxide coating is formed on the surface of the substrate. Suitable organo-metallic compounds for the above-described process are 2-ethyl hexonate salts of transition metals. These compounds and their use in forming metal oxide coatings by pyrolytic techniques is described in U.S. Pat. No. 3,185,586. Other types of organo-metallic compounds which can be used for forming metal oxide films are the transition metal 1,3-beta diketonates, such as are described in U.S. Pat. No. 3,202,054. The transition metal beta diketonates are particularly interesting because they have the ability to form a metal oxide coating of extremely uniform thickness over a large area of substrate. Unfortunately, the beta diketonates of transition metals are only slightly soluble in many of the commonly employed organic solvents. For example, as disclosed in U.S. Pat. No. 3,202,054, transition metal 1,3-beta diketonates are soluble in such organic vehicles as methanol, methanol-pyridine mixtures and methanol-benzene mixtures. Using such solvents in a pyrolytic-type process, particularly on a float line, is dangerous because many commonly used solvents and their vapors are toxic, very flammable and are relatively low-boiling.

In coating float glass, it has been found, as disclosed in U.S. Patent Application Ser. No. 16,670, filed Mar. 5, 1970, that it is best to apply a coating composition to the glass just after it has been freshly formed. When the coating composition is applied at this point, the temperature of the float glass environment is about 1100° F. Using a coating composition which contains a transition metal beta diketonate dissolved in any of the above-described prior-art solvent systems presents a definite toxicity problem and a fire hazard. Also, since the above solvents are relatively low-boiling, they evaporate or pyrolyze before the solution contacts the glass surface. As a result, particles of solute, rather than a true solution, hit the hot glass surface which results in a metal oxide coating having a very poor texture.

SUMMARY OF THE INVENTION

In accordance with this invention, there are provided compositions suitable for forming a metal oxide coating or film on the surface of a heat refractory substrate. The compositions comprise:
 (a) a metal beta diketonate,
 (b) a solvent for said beta diketonate, and
 (c) a halocarbon or a mixture of halocarbons which are different from said solvent and which contain from 1 to 4 carbon atoms.

DETAILED DESCRIPTION

Organo-Metallic Compound

The organo-metallic compound used in the composition of this invention is a beta diketonate of a metal capable of reacting to form an oxide of the metal on contacting a heated surface, i.e., surface having a temperature of about 900°–1200° F. The metal is selected from those having an atomic number from 22 to 92, preferably a transition metal, and most preferably a metal of the first transition series, having an atomic number of from 22 to 29. Such metals include uranium, thorium, erbium, cerium, platinum, antimony, tin, tungsten, titanium, cobalt, iron, chromium, copper, manganese and nickel. The metal is believed to chelate with the carbonyl oxygens of the beta diketonate to form a compound having the following structure:

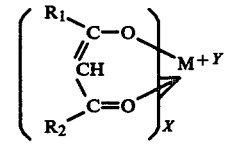

where x and y are equal and y stands for the oxidation state of the transition metal and x stands for the number of ligands chelated with the transition metal.

In the above structure, $R_1$ and $R_2$ can be the same or different. For example, $R_1$ and $R_2$ can be aromatic, such as phenyl, substituted phenyl such as p-methoxy phenyl and p-fluorophenyl, or can be a fused aromatic structure such as naphthyl. $R_1$ and $R_2$ can be heterocyclic, such as 2-thienyl and 2-furyl. Also, $R_1$ and $R_2$ can be aliphatic, such as lower alkyl and lower substituted alkyl, particularly methyl, ethyl, isopropyl and n-propyl and trifluoromethyl and hexafluoropropyl. Further, $R_1$ and $R_2$ can be combined in the form of a ring structure, such as 1,3-cyclohexanedione. Specific examples of beta diketonates which are in accordance with this invention are the following:

2-Acetylcyclohexanone
1,3-Bis(p-fluorophenyl)1,3-propanedione
1,3-Bis(p-methoxyphenyl)-1,3-propanedione
5,5-Dimethyl-1,3-cyclohexanedione
2,6-Dimethyl-3,5-heptanedione
1,3-Di(2-naphthyl)-1,3-propanedione
1,5-Diphenyl-1,3,5-pentanetrione
1,3-Diphenyl-1,3-propanedione
1-(2-Furyl)-1,3-butanedione
4,4,5,5,6,6,6-Heptafluoro-1-(2-thienyl)-1,3-hexanedione
3,5-Heptanedione 1,1,1,5,5,5-Hexafluoro-2,4-pentanedione
2,4-Hexanedione
6-Methyl-2,4-heptanedione
4,6Nonanedione
2,4-Pentanedione
1-Phenyl-1,3-butanedione
1-Phenyl-2,4-pentanedione
2,2,5,5,-Tetramethyl-1,3-cyclohexanedione
1-(2-Thienyl)-1,3-butanedione
1,1,1-Trifluoro-3,5-dimethyl-2,4-hexanedione
4,4,4-Trifluoro-1-(2-furyl)-1,3-butanedione
1,1,1-Trifluoro-2,4-hexanedione
1,1,1-Trifluoro-6-methyl-2,4-heptanedione
1,1,1-Trifluoro-5-methyl-2,4-hexanedione
4,4,4-Trifluoro-1-(2-naphthyl)-1,3-butanedione
1,1,1-Trifluoro-2,4-pentanedione
4,4,4-Trifluoro-1-phenyl-1,3-butanedione
4,4,4-Trifluoro-1-(2-thienyl)-1,3-butanedione Preferred beta diketonates are the 1,3-beta diketonates, such as the acetyl acetonates in which $R_1$ and $R_2$ are both methyl. A more thorough description of the various transition metal beta diketonates are described by commercial manufacturers such as Harshaw Chemical Company. Techniques for their preparation are described by Werner in *Berichte* 34 (1901), pages 2592–2593, by Morgan and Moss, *Journal of the American Chemical Society* 105 (1914), pages 189–201, and in *Gach Monatshefte* 21 (1900), page 103.

It is desirable at times to use a mixture of metal beta diketonates, particularly transition metal beta diketonates. In certain instances, it has been found that particular mixtures of beta diketonates give resultant transparent mixed metal oxide coatings with improved physical and optical properties over those achievable using only one metal beta diketonate. Further, by using various combinations of two or more transition metal beta diketonates, it is possible to get a wide spectrum of pleasing colorations in their resultant mixed oxide coatings. For example, the mixture of iron, chromium and cobalt acetyl acetonates give a resultant transparent mixed metal oxide coating which has greater resistance to surface abrasion than does a comparable metal oxide coating made from any one or any two of the particularly mentioned transition metal acetyl acetonates. Moreover, the combination of iron, chromium and cobalt acetyl acetonates combined in various proportions give resultant transparent mixed oxide coatings which have a wide variety of potential and pleasing colorations. In fact, from this particular combination, it has been found that there are up to 260 colors possible, ranging from browns to greens, as determined by dominant wavelength and excitation purity as derived from tristimulus values that have been adopted by the International Commission on Illumination. An understanding of the determination of color may be had by referring to *Handbook of Colorimetry*, prepared by the staff of the Color Measurement Laboratory, Massachusetts Institute of Technology, under the direction of Arthur C. Hardy. This book was printed in 1936 by the Technology Press, Massachusetts Institute of Technology, Cambridge, Mass.

Solvent System of Metal Beta Diketonate

The solvent system which is used in the practice of this invention includes the following:
(a) a solvent for the beta diketonate, and
(b) a halocarbon or a mixture of halocarbons which are different from said solvent and which contain from 1 to 4 carbon atoms.

The solvent system is a liquid at standard conditions of temperature and pressure, that is, 25° C. and one atmosphere of pressure.

The solvent can be any organic solvent well known in the art for dissolving metal beta diketonates. Such solvents include the aromatic types such as benzene, toluene, ortho, meta and para xylene and mixtures thereof, mesitylene, higher aliphatic hydrocarbons such as heptane and octane, lower aliphatic alcohols such as methanol and ethanol, liquid phenolic compound such as meta-cresol and liquid isomeric mixtures of ortho and para-cresol. The organic solvent is present in amount up to 80 percent, preferably up to 60 percent, and in most cases, from about 0 to 60 percent by volume based on total volume of the organic solvent system (organic solvent plus halocarbon).

The halocarbon (which is different from said organic solvent) is a halocarbon or a mixture of halocarbon compounds selected from those containing from 1 to 4 carbon atoms, preferably halocarbon compounds containing 1 and 2 carbon atoms, and more preferably, halocarbon compounds containing from 1 to 2 carbon atoms and having at least as many chlorine and/or bromine atoms as carbon atoms. The most preferred halocarbon compounds are methylene chloride and halocarbons containing two carbon atoms having at least as many chlorine substituents as carbon atoms, e.g. perchloroethylene and trichloroethylene.

The halocarbon should constitute at least 20 percent, preferably at least 40 percent, and in most cases 40 to 100 percent, by volume of the total organic solvent system (organic solvent plus halocarbon). Examples of the various halocarbons which can be used alone or mixed together include the following: methylene chloride, methylene bromide, chloroform, bromoform, carbon tetrachloride, carbon tetrabromide, 1,1,1-trichloroethane, 1,1,2-trichloroethane, 1,1,2,2-tetrachloroethane, 1,1,1,2-tetrachloroethane, pentachloroethane, 1,1,1-tribromoethane, 1,1,2-tribromoethane, 1,1,2,2-tetrabromoethane, 1,1,1,2-tetrabromoethane, trichloroethylene, tribromoethylene, perchloroethylene, 1,2-dichloropropane, 1,3-dichloropropane, 1-bromo-propane, 1,2-dibromopropane, 1-bromo-2-chloropropane, 2-bromo-1-chloropropane, hexachloropropane, hexachlorobutadiene, 1-bromobutane, 2-bromobutane, trichloromonofluoromethane, dichloroiodomethane, 1,1,1,2-tetrachloro-2-fluoroethane, 1,1,2-trichloro-1,2-difluoroethane, 1,1,1,2-tetrafluorobromoethane, and 1,1,2,2-tetrafluorobromoethane.

As has been mentioned, halocarbons and halocarbon mixtures containing from 1 to 2 carbon atoms are preferred because they have greater solvent power for the metal beta diketonate. When 3 and 4 carbon atom halocarbons are employed in the mixtures, the solvent power of the organic solvent is decreased. Specific halocarbon mixtures which are most desirable are the following: methylene chloride and at least one other halocarbon compound taken from perchloroethylene, trichloroethylene and 1,1,1-trichloroethane.

With regards to solubility, it has been found in preparing compositions of this invention that mixtures of halocarbons containing from 1 to 2 carbon atoms and at least as many halogen atoms as carbon atoms exhibit synergistic activity in their combined form towards dissolving certain transition metal beta diketonates. In other words, a specific volume of a mixture of the halogenated hydrocarbons used in the practice of this invention has greater solvating power in dissolving transition metal beta diketonates than does the same volume of a single halogenated hydrocarbon. Evidence of this synergistic activity is presented in Table I below:

TABLE I

Solubility of Cobaltic, Ferric and Chromium Acetyl Acetonates As a Function of Methylene Chloride-Trichloroethylene Solvent Mixtures, Methylene Chloride-Perchloroethylene Mixtures and Methylene Chloride-1,1,1-Trichloroethane Mixtures

| Volume Percentages of Solvent | | Weight % Metal in Solution | | |
|---|---|---|---|---|
| Methylene Chloride | Trichloroethylene | Co | Fe | Cr |
| 100 | 0 | 4.00 | 4.13 | 3.96 |
| 75 | 25 | 4.55 | 4.15 | 4.02 |
| 60 | 40 | 4.60 | 5.07 | 4.80 |
| 50 | 50 | 4.34 | 5.75 | 5.05 |
| 40 | 60 | 4.10 | 5.76 | 5.30 |
| 25 | 75 | 3.06 | 4.35 | 3.18 |
| 0 | 100 | 1.42 | 1.70 | 1.15 |
| | Perchloroethylene | | | |
| 100 | 0 | 4.00 | 4.13 | 3.96 |
| 85 | 15 | 4.00 | 4.51 | 4.08 |
| 75 | 25 | 5.31 | 5.25 | 4.14 |
| 60 | 40 | 3.83 | 3.97 | 3.77 |
| 50 | 50 | 3.10 | 3.84 | 3.13 |
| 25 | 75 | 1.60 | 3.48 | 2.32 |
| 0 | 100 | 0.08 | 0.46 | 0.16 |
| | 1,1,1-Trichloroethane | | | |
| 100 | 0 | 4.00 | 4.13 | 3.96 |
| 75 | 25 | 4.24 | 4.05 | 3.75 |
| 60 | 40 | 3.77 | 4.81 | 4.42 |
| 50 | 50 | 3.12 | 5.51 | 4.14 |
| 40 | 60 | 2.85 | 5.40 | 4.00 |
| 25 | 75 | 1.93 | 4.48 | 2.73 |
| 0 | 100 | 0.48 | 2.06 | 0.99 |

In the solubility measurements presented in Table I above, 50 ml of solvent is used. Incremental additions of the individual metal acetyl acetonates were added to the solvent with stirring at room temperature until considerable solute was present. Stirring was continued for 2 or 3 hours. The supernated liquid was decanted and centrifuged. About 2 grams of supernated liquid was weighed on an analytical balance and then placed in an air circulating oven for one hour to evaporate the solvent. The weight of metal acetyl acetonates was divided by the weight of the solution to arrive at the weight percentage of metal acetyl acetonates dissolved in the particular solvent. This weight was multiplied by the percentage metal in the metal acetyl acetonate to arrive at the percentage of metal in solution.

The results observed and presented in the above Table I are surprising. As can be seen from the table, trichloroethylene, perchloroethylene and 1,1,1-trichloroethane possess very little solvent power for cobaltic, ferric and chromium acetyl acetonates, yet when mixed with methylene chloride, a fair solvent, synergistic activity occurs and the mixtures have significantly higher solvent power than the individual components of the mixture exhibit by themselves.

The divalent transition metal beta diketonates, such as nickel acetyl acetonate, are particularly difficult to dissolve in the halocarbons described above. Enhanced solubility can be achieved and the resultant solution still rendered high-boiling, nonflammable and nontoxic if up to 35 percent by volume based on total solvent volume of a polar solvent, a lower aliphatic alcohol having from about 1 to 4 carbon atoms, such as methanol or ethanol, is included in the solvent system. Other difficulty soluble divalent transition metal beta diketonates, such as copper acetyl acetonate, can be better solubilized if up to 12 percent by volume based on total solvent volume of a normally liquid phenolic compound, such as meta-cresol or isomeric liquid mixtures of ortho and para-cresol or mixtures of ortho, meta, and para-cresol are incorporated in the solvent medium.

As will be described below, the coating composition is preferably sprayed, in the form of an atomized mist, onto the hot refractory substrate. By spraying, one can better control the thickness and evenness distribution of the resultant coating than is obtainable by other application techniques, such as flooding the composition over the substrate surface. To provide for better atomization and a finer spray mist, branched aromatic hydrocarbons such as toluene, the various xylene isomers and mixtures thereof and mesitylene can be included in the solvent system. These branched aromatic compounds do not permit close packing among the individual molecules of the solvent system and as a result, when the composition is atomized, a finer spray mist is evidenced.

The coating composition should have dissolved therein from about 1 to 10 percent, preferably 1 to 5 percent, by weight of total metal based on the total weight of the composition. For use in coating glass, higher metal contents, i.e., higher than 10 percent by weight total metal in the composition, are not recommended because the heated substrate has insufficient thermal energy to convert uniformly the metal beta diketonate to the metal oxide. This results in texture and mottle and coating with poor aesthetics. However, there should be greater than one percent total metal in the coating compositions in order to get the desired reflectance and solar energy absorbence to make the glasses usable as solar radiation filters in architectural applications. Further, low metal contents result in the substrate being cooled very rapidly, which decreases the pyrolytical efficiency and film forming rate leading to the development of metal oxide coatings having less than optimum thickness.

As has been mentioned above, coating compositions of this invention are particularly suitable for applying to refractory substrates at temperatures which will pyrolyze the composition to form an aesthetically appealing metal oxide film with substantially uniform thickness on the surface of the substrate. Generally, the pyrolysis temperatures encountered are from about 900°–1200° F., and pyrolysis occurs in an oxidizing atmosphere.

To be suitable for use at these conditions, the coating composition should be formulated from the above-mentioned ingredients to produce a composition which is nonflammable under coating conditions and which has a boiling point, measured at atmospheric pressure, of at least 212° F., preferably between 212°–572° F. If the boiling point is lower than the lowest set forth in the above range, that is, lower than 212° F., the solvent system will evaporate too quickly, such that particles of solute rather than solution will hit the hot refractory substrate. This results in a poorly textured metal oxide film which contains numerous pin holes. If the boiling point is too high, that is, about 572° F., evaporation and resultant film formation will be too slow for the composition of the invention to be useful in the coating of continuously manufactured glass, such as float glass.

The vapor pressure range of the composition is also very important and should be no higher than 80 mm of Hg at 77° F., preferably below 60 mm of Hg. A composition having a low vapor pressure, i.e., below 80 mm of Hg, provides for a consistently even flow rate when the coating composition of the invention is used in a spraying apparatus at extreme temperature conditions such as are encountered when coating float glass. it has been found in coating float glass that the coating composition should be applied to the glass immediately after the glass ribbon is removed from the molten metal bath. The glass in its environment is at extremely high temperatures at this point, from about 900°–1200° F., and to get a finely textured metal oxide coating on the glass, it is critical that the coating composition be supplied to the glass in a consistent and even flow rate. If the vapor pressure is below the above-specified upper limit, the dangers of vapor lock in the supply line which is used to supply coating composition to a spraying device is significantly minimized. Too high a vapor pressure results in increased incidence of vapor lock.

If the organic solvent is a compound which has a relatively low boiling point, and high vapor pressure, then the halocarbon solvent or mixture of halocarbons which are different from the organic solvent, should be selected from those halocarbons which have relatively higher boiling points and lower vapor pressures to give a resultant solvent mixture which meets the above-described requisites for boiling point and vapor pressure. For example, if the organic solvent is benzene, which has a boiling point of 176° F., then a higher boiling halocarbon such as perchloroethylene, which has a boiling point of 248° F., should be combined in proper proportions with benzene so as to give a resultant slvent mixture which as the requisite boiling point and vapor pressure. If, on the other hand, the organic solvent has a relatively high boiling point and low vapor pressure, like mesitylene, boiling point 329° F., then a lower boiling halocarbon such as methylene chloride, which has a boiling point of 104° F. can be combined with the mesitylene to form a resultant solvent system which meets the above requirements of boiling point and vapor pressure.

The compositions of this invention can be made by techniques well known in the art. For example, compositions can be made by adding with stirring the metal beta diketonate in a desired amount to a particular solvent system at room temperature with stirring. When mixed metal beta diketonate solutions are desired, the individual metal beta diketonates can be combined beforehand in the desired ratios and then added in the combined form to a particular solvent system. Alternately, the individual metal beta diketonates can be dissolved individually in a particular solvent and the solutions combined to form the particularly desired mixture of metal beta diketonates in solution.

This latter technique of first individually dissolving the metal beta diketonates and then combining the individual solutions has been found to be particularly useful in preparing solution mixtures containing transition metal beta diketonates that are more difficult to dissolve, such as nickel and copper acetyl acetonates. Higher amounts of nickel and/or copper acetyl acetonates can be solubilized by dissolving them individually in a particular solvent mixture and then combining the solutions with others individually prepared.

As has been mentioned above, the compositions of the present invention, being nonflammable, having high boiling points and low vapor pressures, are particularly useful in forming a metal oxide coating on a continuous ribbon of float glass.

In a typical float glass operation, a continuous glass ribbon is drawn along the surface of a bath of molten metal. The bath is usually tin or a tin-containing alloy contained in a reducing atmosphere. The bath is maintained at an elevated temperature so that the glass ribbon in contact therewith is sufficiently soft to flow. The temperature of the bath is progressively decreased along the direction of ribbon movement to permit the ribbon to harden and form. The hardened glass is removed from the end of the bath and conveyed through an annealing lehr on conventional conveyor rolls. A typical process for making float glass is described in U.S. Pat. No. 3,083,551.

The coating composition of the invention is applied at a coating station which is located between the end of the molten metal bath and the beginning of the annealing lehr. At this location, conditions are excellent for pyrolytically depositing a metal oxide coating. The temperature of the glass is about 1100° F. at this point, and there is sufficient oxygen in the surrounding air to insure the formation of metal oxide. The coating can be applied by spraying, such as described in U.S. Pat. No. 3,660,061, the spray being applied from a spray gun at a rapid velocity toward the glass ribbon, and traversing a relatively short distance en route to the ribbon so as to have the coating composition contact the glass before its solvent is completely evaporated. Preferably, the distance from the spray gun to ribbon surface is less than one foot. The composition of the invention should be stored under pressure in an enclosed system and delivered to spray guns in conduits insulated from the hot environment of the coating station. The spray guns should be packed in thermal insulation to insulate the spray solution from the hot atmosphere of the spraying station, thus keeping the solution in the liquid state and maintaining the metal concentration at the desired level until the spray is emitted from each spray gun.

EXAMPLES

EXAMPLES I–VIII

The following examples show the preparation of various coating compositions disclosed in the invention and their application in pyrolytically coating glass substrates.

EXAMPLE I

A mixed ferric-chromium acetyl acetonate solution was prepared as follows: 100 grams of ferric acetyl acetonate and 26.6 grams of chromium acetyl acetonate were dissolved in 874 grams, 633 milliliters, of a solvent comprising 20 percent by volume methylene chloride, 35 percent by volume trichloroethylene and 45 percent by volume perchloroethylene. The mixed solvent was nonflammable as determined by spraying the solution into a natural gas flame of a Bunsen burner. The weight ratio of iron to chromium was 80:20 and the total metal in solution was 2 percent by weight based on total weight of the solution. The solution was then sprayed with a hand spray gun on a flat glass substrate which was preheated to a temperature of about 1100° F. The coating composition pyrolyzed to give a substantially transparent, gold-colored coating having a uniform thickness of about 450–500 Angstroms.

EXAMPLE II

A mixed cobaltic, ferric, chromium acetyl acetonate solution was prepared as follows: 1967 grams of cobaltic acetyl acetonate, 497 grams of ferric acetyl acetonate and 65 grams of chromium acetyl acetonate were dissolved in 12,420 milliliters of a mixed solvent comprising 20 percent by volume methylene chloride, 35 percent by volume trichloroethylene and 45 percent by volume perchloroethylene. The ratio of cobalt to iron to chromium in the solution is 64:16:20 and the total metal in solution is 2½ percent by weight based on total weight of the solution. The solution was then sprayed on a ¼ inch flat glass substrate which was preheated to a temperature of about 1100° F. The composition pyrolyzed on application to give a substantially bronze-colored coating having a uniform thickness of about 450–500 Angstroms.

EXAMPLES III–VIII

A series of mixed cupric, manganic and nickel acetyl acetonate solutions were prepared as follows: The three acetyl acetonates were each dissolved by themselves in an aliquot portion of a solvent mixture of meta-cresol, methylene chloride and trichloroethylene. The three solutions wee then combined to form the mixed cupric, manganic and nickel acetyl acetonate solutions. Table II below summarizes the parts by weight of solute and solvent in the various solutions.

Table II

| | Mixed Copper, Manganese and Nickel Acetyl Acetonate Solutions | | | | |
|---|---|---|---|---|---|
| | Weight in Grams of | Volume of Solvent in Milliliters | | | |
| Example No. | Metal Acetyl Acetonate | Meta-Cresol | Methylene Chloride | Trichloroethylene | Methanol |
| III | Cupric 4.0 | 7.5 | 21.3 | 21.3 | |
| | Manganic 65.0 | | 250 | 250 | |
| | Nickel 22.5 | | 87.5 | 87.5 | 75 |
| IV | Cupric 8.0 | 15 | 42.5 | 42.5 | |
| | Manganic 65 | | 250 | 250 | |
| | Nickel 36 | | 140 | 140 | 120 |
| V | Cupric 6.4 | 12 | 34 | 34 | |
| | Manganic 78 | | 300 | 300 | |
| | Nickel 54 | | 210 | 210 | 180 |
| VI | Cupric 8.0 | 15 | 42.5 | 42.5 | |
| | Manganic 65 | | 250 | 250 | |
| | Nickel 22.5 | | 87.5 | 87.5 | 75 |
| VII | Cupric 12 | 22.5 | 63.8 | 63.8 | |
| | Manganic 65 | | 250 | 250 | |
| | Nickel 22.5 | | 87.5 | 87.5 | 75 |
| VIII | Cupric 16 | 30 | 85 | 85 | |
| | Manganic 65 | | 250 | 250 | |
| | Nickel 22.5 | | 87.5 | 87.5 | 75 |

The above mixed copper, manganese and nickel acetyl acetonate solutions each contained 2 percent by weight total metal based on total weight of the solution. The weight ratio of the various metals to one another and the volume ratio of the various solvents in the mixed solvent system is summarized in Table III below.

Table III

| | Weight and Volume Ratio of Various Metals and Solvents in Mixed Copper, Manganese and Nickel Acetyl Acetonate Solutions | | | | | | |
|---|---|---|---|---|---|---|---|
| | Weight Ratios of Various Metals to One Another | | | Volume Ratio of Various Solvents to One Another | | | |
| Example No. | Cu | Mn | Ni | Meta-Cresol | Methylene Chloride | Trichloroethylene | Methanol |
| III | 6 | 63 | 31 | 0.9 | 44.9 | 44.9 | 9.3 |
| IV | 10 | 50 | 40 | 1.5 | 43.25 | 43.25 | 12.0 |
| V | 6 | 47 | 47 | 0.9 | 42.6 | 42.6 | 13.9 |
| VI | 12 | 59 | 29 | 1.8 | 44.8 | 44.8 | 8.6 |
| VII | 17 | 55 | 28 | 2.5 | 44.6 | 44.6 | 8.3 |
| VIII | 21 | 53 | 26 | 3.2 | 44.5 | 44.5 | 7.8 |

The compositions of Examples III to VIII were nonflammable as determined by spraying the solvents into a natural gas flame of a Bunsen burner.

The various compositions described in Examples I to VIII were used to coat a flat glass substrate, and then the optical properties of the coated substrate were determined. The coating operation was as follows:

An 18 inch by 18 inch sheet of commercially available float glass, ¼ inch in thickness, was heated in a loft furnace at a temperature of 1260° F. for 4 minutes to raise the temperature of the glass to about 1100° F. The glass was removed from the oven and immediately sprayed using a hand spray gun. In all cases a uniformly thick, finely textured, substantially transparent coating of about 450–500 Angstroms resulted. This thickness was obtained by stopping the spraying before getting into a first order amber interference diffraction reflected color formed on the glass surface. The glass was cooled to room temperature and then fabricated into a double glazed unit, hermetically sealed. The air space between the two panes of glass was ½ inch and the coated surface was the second surface exposed to the air space side of the exterior. The glass was evaluated for optical properties and the results are reported in Table IV below.

Table IV

| | Optical and Solar Properties of ¼ Inch Float Glass, Which Has Been Pyrolytically Treated With the Compositions of the Invention | | | | | | | | | | |
|---|---|---|---|---|---|---|---|---|---|---|---|
| | | Dominant Wavelength in | Excitation | Transmittance | | | Reflectance | | | Shading | |
| Sample No. | Color | Millimicrons | Purity | Lum. | I.R. | T.S.E. | Lum. | I.R. | T.S.E. | Coefficient | U-Value |
| Example III | Pink-Gray | 513 | 0.6% | 22 | 20 | 20 | 20 | 17 | 18 | 0.352 | 0.599 |

Table IV-continued
Optical and Solar Properties of ¼ Inch Float Glass, Which Has Been Pyrolytically Treated With the Compositions of the Invention

| Sample No. | Color | Dominant Wavelength in Millimicrons | Excitation Purity | Transmittance | | | Reflectance | | | Shading Coefficient | U-Value |
|---|---|---|---|---|---|---|---|---|---|---|---|
| | | | | Lum. | I.R. | T.S.E. | Lum. | I.R. | T.S.E. | | |
| Example IV | Gray | 491 | 2.6% | 24 | 20 | 21 | 18 | 15 | 16 | 0.373 | 0.600 |
| Example V | Gray | 540 | 1.2% | 28 | 25 | 25 | 20 | 14 | 16 | 0.418 | 0.598 |
| Example VI | Blue-Gray | 484 | 7.1% | 20 | 16 | 18 | 17 | 16 | 16 | 0.316 | 0.606 |
| Example VII | Blue | 482 | 13.3% | 13 | 10 | 11 | 17 | 19 | 18 | 0.263 | 0.608 |
| Example VIII | Blue | 482 | 11.6% | 15 | 12 | 13 | 17 | 19 | 17 | 0.281 | 0.605 |

The specifications for determining color, such as dominant wavelength and excitation purity, have been derived from tristimulus values that have been adopted by the International Commission on Illumination as a direct result of experiments involving many observers. These specifications can be determined by calculating the trichromatic coefficients, x, y and z, from the tristimulus values. The trichromatic coefficients, x and y, are plotted on a chromaticity diagram and compared with the coordinates of Illuminant "C" as a standard light source. This comparison provides the information to determine the excitation purity and dominant wavelength. The lower the excitation purity of a color, the closer it is to being a neutral color. An understanding of these terms and definitions thereof may be had by referring to the *Handbook of Colorimetry*, prepared by the staff of the Color Measurement Laboratory, Massachusetts Institute of Technology, under the direction of Arthur C. Hardy. This book was printed in 1936 by the Technology Press, Massachusetts Institute of Technology, Cambridge, Mass.

The luminous transmittance and reflectance is a summation of the percentage of the incident, visible radiant energy (weighted by the energy distribution of the source and the eye's sensitivity) that will pass through or be reflected from the glass as described. In the present invention, the source, unless otherwise stated, is Illuminant "C", a standard source adopted by the International Commission on Illumination.

The I.R. transmittance is the transmittance of infrared radiation having a wavelength range of from 800–2100 millimicrons that will pass through the glass as described.

The total solar energy transmittance and reflectance of the glass is calculated from the spectral transmittance or reflectance of the glass and the spectral distribution of solar radiant energy. The latter values are those of Parry Moon (*Journal of the Franklin Institute*, Volume 230, 1940).

The shading coefficient is the ratio of heat gain of the sample expressed as B.T.U./hr./ft.$^2$ which is transmitted through the sample divided by 200 B.T.U./hr./ft.$^2$ which is the heat transmitted by ¼ inch clear glass at 4:00 P.M., July 21, West Elevation, at a point 40° North latitude. This average value has been determined by years of observation and assumes the temperatures on either side of the sample are equal.

The U-value is the thermal conductivity of the sample expressed as B.T.U./ft.$^2$/hr./° F. For ¼ inch clear glass, the U-value is 1.1. For double glazed ¼ inch clear glass, the U-value is 0.66.

The spectral transmittance and reflectance measurements of the glasses of the present invention were made by standard spectrophotometric methods. A Beckman Quartz Spectrophotometer, Model DK-2A is used for wavelengths between 300 and 2300 millimicrons.

The thicknesses of the coating can be determined by use of an interference microscope.

EXAMPLES IX TO XI

The following examples show the application of the composition of the invention to a float glass substrate during a float glass production run.

EXAMPLE IX

Four 4-gallon batches of a mixed ferric-chromium acetyl acetonate solution were prepared generally as described in Example I. To each gallon of solvent (20 percent by volume methylene chloride, 35 percent by volume trichloroethylene and 45 percent by volume perchloroethylene) was added 552 grams of ferric acetyl acetonate and 148 grams of chromium acetyl acetonate to produce a coating composition having a total of 2 percent by weight based on total weight of the solution of the metal in solution.

The glass ribbon on the float line moved at a varying speed of 173–186 inches per minute through a coating station where there was located a bank of three DeVilbiss spray guns. The spray guns are reciprocated over a 120 inch wide path of float glass. The guns were disposed above the central portion of the ribbon and reciprocated at a speed of about 24 cycles per minute. The ribbon temperature was between 1000° and 1100° F. at the coating station and about 1065° F. where the ribbon first crossed the spray.

The spray guns were mounted in a triangular array and moved in unison in a direction normal to the longitudinal path of the glass ribbon movement with the center gun pointed directly down, its orifice being about 11 inches above the ribbon. The other two spray guns were mounted in symmetrical relation to the first gun and pointed obliquely downward towards the center of the array with their orifices located about 9 inches above the ribbon. The outer guns were 30 inches apart at their upper ends and 23 inches apart at their orifices. The spray gun orifices were set at 0.026 inch diamter.

Air was supplied to each spray gun under a pressure of about 55 pounds per square inch measured at the source. The spray composition was applied at a pressure of 20–36 pounds per square inch giving a spray rate of 260–340 cubic centimeters/minute. During a 60 minute run, 11–12 gallons of the above solution were dispensed onto the ribbon producing 8000 square feet of coated float glass. Coverage was 5.3 cc/ft.$^2$.

The coated float glass ribbon was then annealed in an oxidizing atmosphere using regular annealing procedures of commercial production and the coated glass was then cut to a desired size. The appearance of the cut coated glass articles so produced was quite acceptable by inspection with the naked eye in that the film was uniformly textured and had a pleasing gold color. The coated glass article had the following optical properties:

Percent Total Solar Energy Reflectance: 29
Percent Luminous Transmittance: 47

The durability of the coated sheets produced according to the method of Example IX was tested cutting 20 samples each 12 inches × 12 inches from the continuous ribbon of coated float glass. The cut specimens were subjected to a continuous spray within an enclosed chamber as described in Method 811 of the Federal Test Method Standard No. 151 (formerly Federal Specification ZZ-M-151) entitled "Salt Spray Test". The spray is a 5 percent sodium chloride solution in the form of a fog that is sprayed at 95° F. and that condenses on the film surface. After more than 5000 hours of continuous exposure to the salt spray, none of the samples exhibited film attack.

EXAMPLE X

Four gallons of mixed cobaltic, ferric, chromium acetyl acetonate solution were prepared as generally described in Example II. To the four gallons of solvent (20 percent by volume methylene chloride, 35 percent by volume trichloroethylene, 45 percent by volume perchloroethylene) was added 657 grams of chromium acetyl acetonate, 1967 grams of cobaltic acetyl acetonate and 497 grams of ferric acetyl acetonate to produce a coating composition having a total of 2.5 percent by weight of metal in solution. The coating composition was applied to the glass ribbon as generally described in Example IX, that is, the glass ribbon speed was 200 inches per minute; the air pressure was 55 pounds per square inch; the spray pressure was from 27 to 30 pounds per square inch; the run was conducted for 15 minutes, consumed 3.6 gallons of solution, to give 2400 square feet of coated glass. The coated float glass was annealed and cut to size as described in Example IX. Upon visual examination, the specimens were uniformly coated and were a pleasing reddish-brown in color. Cut specimens had the following optical properties:
Percent Total Solar Energy Reflectance: 30
Percent Luminous Transmittance: 37

EXAMPLE XI

Six gallons of a mixed cupric, manganic and nickel acetyl acetonate solution were prepared generally according to the method of Example IV. The coating composition had a total of 2 percent by weight of metal in the following ratios: copper:manganese:nickel 12:59:29.

The coating composition was then sprayed on a float glass ribbon as generally described in Example IX. The glass ribbon speed was 180 inches per minute; the air pressure was 50–77 psi; spray pressure was 26–36 psi; the spray rate was about 300 cubic centimeters/minute; the run was conducted for 21 minutes, which consumed 5.7 gallons of solution, and which produced 3150 square feet of coated glass. Coverage was 520 ft.$^2$/gal. The coated float glass was annealed and cut as described in Example IX. The cut specimens were observed visually and were found to be blue-gray in color. The specimens had the following optical properties:
Percent Total Solar Energy Reflectance: 25
Percent Luminous Transmittance: 37

EXAMPLE XII

A mixed nickel-ferric acetyl acetonate solution was prepared as follows: 1764 grams of ferric acetyl acetonate and 540 grams of nickel acetyl acetonate were dissolved in a mixed solvent comprising 12,420 milliliters of toluene, 2800 milliliters of trichloroethylene, 1200 cc of meta-cresol and 1200 cc of methanol. The solvent mixture is nonflammable as determined by spraying the solution into a natural gas flame of a Bunsen burner. The weight ratio of iron to nickel was 70:30 and the total metal in solution was about 2 percent by weight based on total weight of the solution. The solution was then sprayed with a hand spray gun on a flat glass substrate which was preheated to a temperature of about 1100° F. The coating composition pyrolyzed to give a substantially transparent, gold-colored coating.

The total solar energy reflectance of the sample is 30 percent and the luminous transmittance is 47 percent.

EXAMPLE XIII

A mixed cupric, manganic and nickel acetyl acetonate solution was prepared as follows: 8 grams of cupric acetyl acetonate were dissolved in a mixture of 15 milliliters of meta-cresol and 57 milliliters of methylene chloride. Nine (9) grams of manganic acetyl acetonate were dissolved in a mixture of 75 milliliters of toluene and 30 milliliters of methanol. Nine (9) grams of nickel acetyl acetonate were dissolved in a mixture of 20 milliliters of meta-cresol, 60 milliliters of toluene and 20 milliliters of methanol. The solutions were then combined to form the mixed cupric, manganic and nickel acetyl acetonate solution. The weight ratio of copper to manganese to nickel was 10:50:40. The weight ratio of metal in solution was about 2 percent by weight based on total weight of the solution. The solution was then sprayed with a hand spray gun on a flat glass substrate which was preheated to a temperature of about 1100° F. The coating composition pyrolyzed to give a substantially transparent, gray-colored coating. The total solar energy reflectance of the sample is 33 percent and the luminous transmittance is 25 percent.

Thus, in accordance with the above detailed description of the invention, particularly as set forth in the Working Examples, it can be seen that the present invention provides coating compositions which are safe and suitable for application to a freshly formed ribbon of float glass. Compositions conforming to the present invention use an organic solvent which is nonflammable under coating conditions, which has a high-boiling point, and which is not particularly toxic. The present invention particularly provides transition metal beta diketonate compositions which are suitable for producing even, aesthetically appealing metal oxide coatings on the surface of a freshly formed float glass substrate. The transition metal beta diketonates are dissolved in a solvent which is nonflammable, high-boiling and not particularly toxic.

The Working Examples show formation of high quality metal oxide coatings or films by hot spray techniques in which the coatings or films are applied by spraying a hot substrate with a solution of the metal beta diketonate. Those skilled in the art will realize, however, that other techniques can be used, with the compositions of the invention, to form metal oxide coatings. Such other techniques include, for example, chemical vapor deposition, such as is described in U.S. Pat. No. 3,330,694.

I claim:

1. A composition for producing a metal oxide film on a surface of a heated substrate by contacting the surface, at a temperature sufficient to thermally decompose an organo-metallic coating reactant to metal oxide, with said composition comprising:

a. a beta diketonate of a metal capable of forming an oxide of said metal;
b. a solvent for said beta diketonate which comprises a halocarbon containing from 1 to 4 carbon atoms; and
c. a phenolic compound.

2. The composition according to claim 1, wherein the phenolic compound is a liquid at standard temperature and pressure and comprises up to 12 percent by volume of the composition.

3. The composition according to claim 2, wherein the phenolic compound is a cresol or a mixture of cresols.

4. The composition according to claim 3, wherein the phenolic compound is meta-cresol.

5. The composition according to claim 1, wherein the solvent for said beta diketonate comprises a mixture of halocarbons at least one of which has 1 to 2 carbon atoms and at least as many halogen atoms, selected from the group consisting of chlorine and bromine atoms, as carbon atoms.

6. The composition according to claim 5, wherein the mixture of halocarbons has greater solvating power for said metal beta diketonate than the same volume of any one of the halocarbons of said mixture.

7. The composition according to claim 6, wherein the mixture of halocarbons comprises methylene chloride and a second halocarbon selected from the group consisting of 1,1,1-trichloroethane, trichloroethylene, perchloroethylene and mixtures thereof.

8. The composition according to claim 1 which further comprises up to about 35 percent by volume of an aliphatic alcohol containing from 1 to about 4 carbon atoms.

9. The composition according to claim 8, wherein said aliphatic alcohol is methanol.

10. The composition according to claim 1, wherein the metal of said beta diketonate has an atomic number of from 22 to 29.

11. The composition according to claim 1, wherein the beta diketonate is the acetyl acetonate of a metal selected from the group consisting of cobalt, iron, chromium, copper, manganese, nickel, titanium, vanadium and mixtures thereof.

12. The composition according to claim 1, wherein the beta diketonate consists essentially of a mixture of cobalt, chromium and iron acetyl acetonates and the solvent for said beta diketonate consists essentially of:
a. from about 5 to about 25 percent by volume methylene chloride;
b. from about 30 to about 40 percent by volume trichloroethylene; and
c. from about 40 to about 50 percent by volume perchloroethylene.

13. The composition according to claim 1 which comprises by volume:
a. from about 0.5 to about 4 percent cresol;
b. from about 40 to about 50 percent methylene chloride;
c. from about 40 to about 50 percent trichloroethylene; and
d. from about 5 to about 15 percent methanol.

14. The composition according to claim 13, wherein said cresol is meta-cresol.

15. The composition according to claim 14, wherein the beta diketonate consists essentially of a mixture of copper, manganese and nickel acetyl acetonates.

* * * * *